United States Patent [19]

Perreault

[11] 4,027,257
[45] May 31, 1977

[54] FREQUENCY DOMAIN AUTOMATIC EQUALIZER HAVING LOGIC CIRCUITRY

[75] Inventor: Donald A. Perreault, Dallas, Tex.

[73] Assignee: Xerox Corporation, Stamford, Conn.

[22] Filed: June 1, 1976

[21] Appl. No.: 691,809

[52] U.S. Cl. .................................. 333/18; 325/42; 235/156
[51] Int. Cl.² ......................................... H03H 7/16
[58] Field of Search .................... 333/16, 18, 70 T; 325/42, 65; 324/77 B

[56] References Cited
UNITED STATES PATENTS

| | | | |
|---|---|---|---|
| 3,614,673 | 10/1971 | Kang et al. | 333/18 |
| 3,651,316 | 3/1972 | Gibson | 333/18 X |
| 3,715,666 | 2/1973 | Mueller et al. | 333/18 X |
| 3,851,162 | 11/1974 | Munoz | 324/77 B X |

Primary Examiner—Paul L. Gensler

[57] ABSTRACT

An automatic equalizer for calculating the equalization transfer function of a transmission channel and applying same to equalize received signals. The initial calculation as well as the equalization proper are conducted entirely within the frequency domain. Equalization coefficients are obtained using successive approximations approaching the desired values. The equalization coefficients may be adjusted independently from each other inasmuch as these coefficients are not interdependent. Successive approximations of the coefficients differ by fixed increments of the real or imaginary components. A feedback circuit is utilized in generating the successive approximations wherein sign or polarity information is used to determine the adjustment necessary for convergence.

25 Claims, 15 Drawing Figures

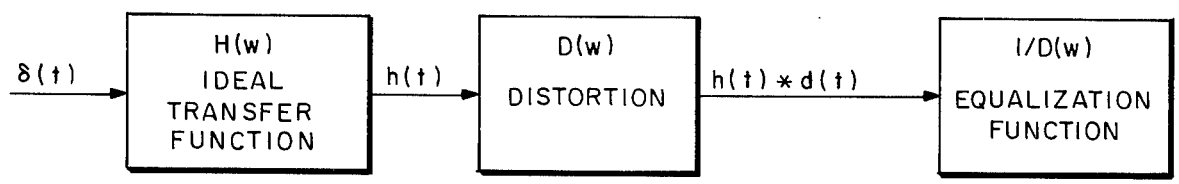
FIG. 1
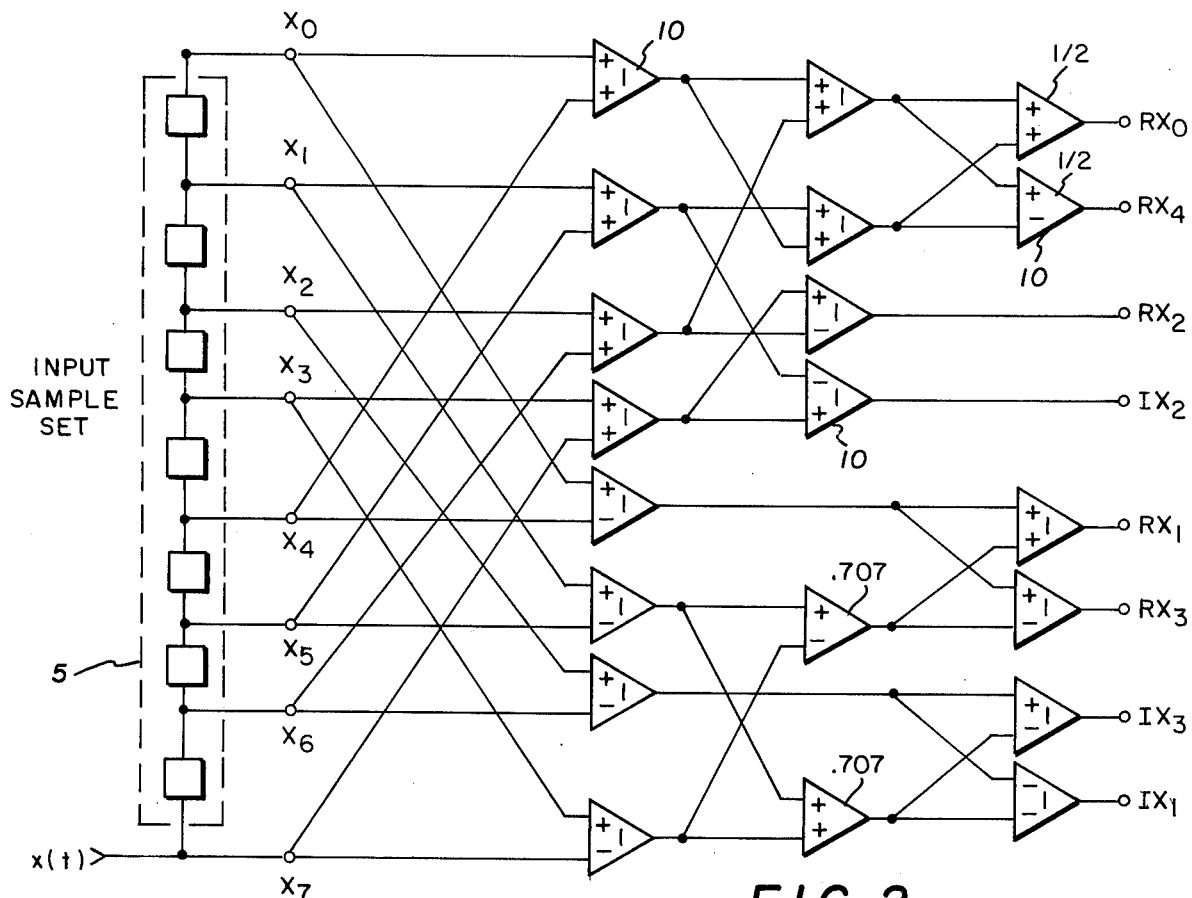
FIG. 2
FIG. 3A
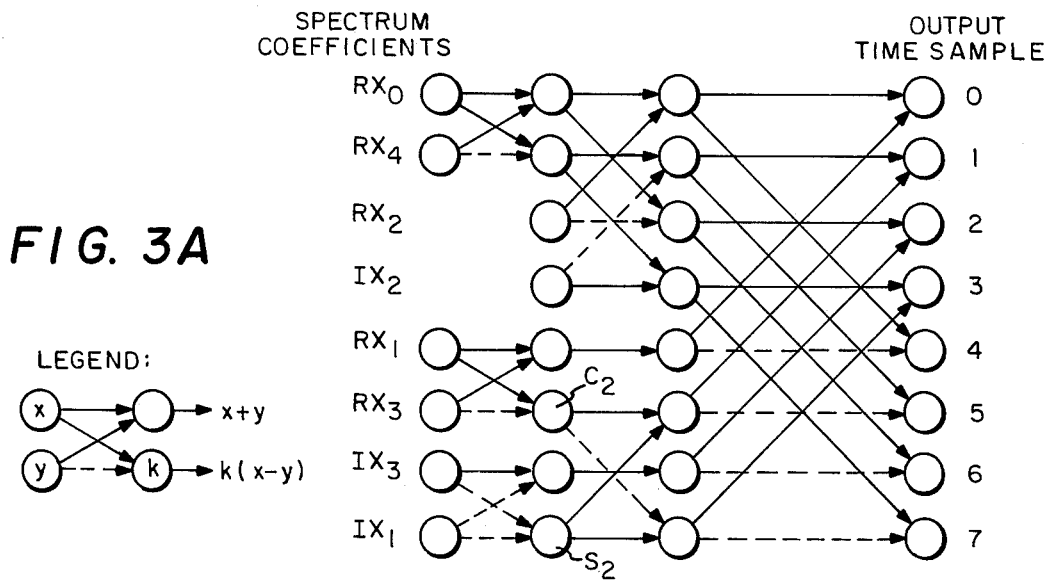

LEGEND:
SRX = SIGN OF RX
SIX = SIGN OF IX
SER = SIGN OF ERROR $e_R$
SEI = SIGN OF ERROR $e_I$

FREQUENCY DOMAIN AUTOMATIC EQUALIZER HAVING LOGIC CIRCUITRY

BACKGROUND OF THE INVENTION

1. Field of the Invention

The invention pertains to frequency domain automatic equalization for electrical signals used in transmission of information.

2. Description of the Prior Art

Ideally, it is desirable to transmit electrical signals such that no interference occurs between successive symbols. In practice, however, transmission channels are bandlimited and interference is controlled utilizing clocked systems with equalization conventionally performed in the time domain.

Most conventional automatic equalizers operate in a feedback mode so that the effects of changes in the equalizer transfer function are monitored and used to produce further changes in the transfer function to obtain the best output signals. In such systems, the measurements of the output signal are made in the time domain. Typically, the transfer function may be constructed in the time domain by adjusting the tap gains of a tapped delay line during an initial training period prior to actual message transmission. Examples of such systems are shown in U.S. Pat. Nos. 3,375,473 and 3,292,110.

Frequency domain equalization utilizing time domain adjustments are shown, for example, in U.S. Pat. No. 3,614,673, issued to George Su Kang. Kang utilizes frequency domain measurement and calculations to produce the time domain impulse response of a transversal filter. The inpulse response of the transversal filter is applied to set the weights of the transversal filter.

Other approaches to frequency domain equalization require transmission of the discrete Fourier transform of the source signal and require the use of complex analogue circuitry in obtaining an approximation to the desired equalization. See, for example, Weinstein and Ebert, "Transmission by Frequency — Division Multiplexing Using the Discrete Fourier Transform, IEEE Transactions on Communication Technology, Vol. COM-19, No. 5, October, 1971, pp. 628–634.

SUMMARY OF THE INVENTION

The principal oject of the invention is to provide an automatic equalizer using successive approximations and operable completely in the frequency domain to provide both frequency domain measurements of the transmitted signal and frequency domain corrections to equalize channel amplitude and phase distortion.

Another object of the invention is to provide a frequency domain equalizer employing the discrete Fourier transform and a frequency correction feedback circuit which is responsive to the algebraic sign of the spectral components of the received signal and the algebraic sign of an internally generated error signal.

It is a further object of the invention to provide an alternate approach to generating equalization coefficients in a frequency domain equalizer, as disclosed, for example, in applicant's copending application for "Frequency Domain Automatic Equalizer Utilizing the Discrete Fourier Transform", Ser. No. 706,703 filed July 19, 1976, assigned to the assignee hereof.

Yet, another object of the invention is to utilize time-shared circuitry for minimizing circuit complexity and expense.

Another object of the invention is to provide a frequency domain equalizer having independently adjustable spectral coefficients so that adjustment of one coefficient does not necessitate adjustment of other coefficients.

A frequency domain equalizer of the present invention automatically equalizes the spectral components of a received signal transmitted through a distortion affected transmission channel and comprises multiplying means and feedback control means. The multiplying means performs a complex multiplication of a complex input signal X and a complex multiplicand correction signal C, thereby generating a complex product signal Y. The input signal X has a first factor, D, corresponding to a distortion transfer function of the transmission channel, and a second factor, H, corresponding to an undistorted transfer function of the transmission channel. The feedback control means receives the complex product signal Y and generates a value of the correction signal C, which is inversely proportional to the first factor D of the multiplier input signal X. Further, the feedback control means comprises a reference means for generating a complex reference signal proportional to the second factor, H, of the input signal X, a means for comparing the product signal Y with the reference signal, a means for generating error polarity signals having an algebraic sign corresponding to the difference between the compared product signal Y and the reference signal, and a means for adjusting the value of the correction signal C to produce a value for the product signal Y approximately equal to the reference signal. The adjusting means is responsive to the algebraic sign of the error polarity signals and the algebraic sign of real and imaginary components of the input signal X.

BRIEF DESCRIPTION OF THE DRAWINGS

These and other features and advantages of the invention will become apparent when taken in conjunction with the following specification and drawings wherein:

FIG. 1 is a block diagram of the overall theoretical model used in the instant invention;

FIG. 2 is a schematic diagram of an analog circuit for performing the discrete Fourier transform of a sample set;

FIG. 3A illustrates a tree graph for the inverse discrete Fourier transform;

DETAILED DESCRIPTION OF THE PREFERRED EMBODIMENT

Figure 3B:
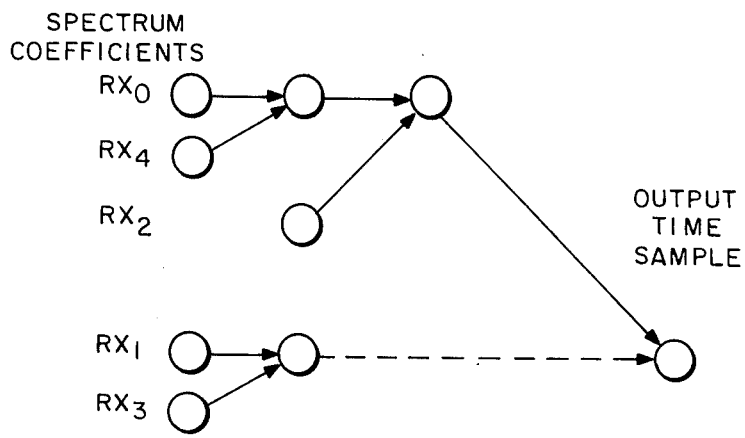
FIG. 3B illustrates a tree graph for the sparse inverse discrete Fourier transform.

A block diagram of the model of the transmission system is shown in FIG. 1. The system is assumed linear, and it is therefore theoretically immaterial where in the system the distorting elements are located. The transfer function $H(w)$ is a composite of all the ideal elements of the system and is shown in cascade with $D(w)$ which is a composite of all the linear distorting elements of the system. It is assumed that in impulse response $h(t)$ is the ideal symbol and that the information is represented by the magnitude and/or polarity of impulses at the input to $H(w)$ which impulses are spaced in time according to the requirements of $h(t)$ and the detection process. The output of the system before equalization is the Fourier transform of $H(w) \times D(w)$ or the convolution of $h(t)$ and $d(t)$, and is no longer ideal. The equalizer is connected in cascade with the distortion network and functions to eliminate the effects of $D(w)$ i.e., the transfer function of the equalizer is $1/D(w)$. $/D(w)$. The equalizer precedes the decision point at the receiver, and the system is capable of determining $D(w)$ and then producing the transfer function $1/D(w)$ in the transmission path.

FIG. 2 shows an analog discrete Fourier transform (ADFT) circuit which produces a set of electrical signals which represent the real and imaginary coefficients respectively of samples of the Fourier transforms, i.e., frequency spectrum, of the input signal. The input to the ADFT circuit comprises a discrete sample set of, for example, eight samples $x_0, x_1, \ldots x_7$ of the received signal $x(t)$. The sample set may be taken, for example, from terminals of a tapped delay line 5. The discrete $i^{th}$ sample set $[X]_i = x_0(i), \ldots x_7(i)$ is transformed by the ADFT circuit into the frequency domain and represented by vectors $X_n$ which are generally complex. Real and imaginary parts of the vector and designated $RX_n$ and $IX_n$, respectively. Similarly, RH, IH and RD, ID designate respectively the real and imaginary parts of the respective transfer functions H and D.

It is contemplated, however, that the input signal may be digitized in an analog-to-digital converter, and that the sample set could be taken from a digital shift register. In such a case, the digitized shift register output could be converted to analog form (via a D/A converter) and used in the analog circuit shown in FIG. 2. Thus, any equivalent for the tapped delay line or for the digital shift register may be used to provide the sample set to the ADFT.

FIG. 2 shows a plurality of operational amplifiers 10 having input terminals marked + or − for indicating the additive or subtractive function performed therein. The gain of the amplifiers is indicated by the multiplication factor shown. All amplifiers have unity gain except those having gain 0.707. If more than eight sample points are used to increase the range of the equalizer, the structure of FIG. 2 would be expanded and would include additional non-unity gain amplifiers. The ADFT circuit shown in FIG. 2 receives N samples ($N=8$) of a real input function $x(t)$. For the real time samples $x(t)$, the frequency components $X_n$ for $n>N/2$ are the complex conjugates of $X_n$ for $n<N/2$. Additionally, $X_0$ and $X_{N/2}$ are real. Consequently, $X_0$ and $X_4$ have real components only. Non-redundant information is obtained using $X_0$ and $X_4$ and the real and imaginary parts of vectors $X_1, X_2$ and $X_3$ (alternately, vectors $X_5, X_6$ and $X_7$ could be used instead of vectors $X_1, X_2$ and $X_3$). The complex vectors $X_1, X_2$ and $X_3$ specify six parameters, and the real vectors $X_0, X_4$ give two more parameters yielding a total of eight parameters consistent with the number of sample points of $x(t)$. ADFT circuitry is described more generally, for example, in copending application entitled "Time Domain Automatic Equalizer with Frequency Domain Control", Ser. No. 691,008, filed June 1, 1976, in U.S. Pat. No. 3,851,162 to Robert Munoz, the whole of both references incorporated herein by reference.

Figure 3C:
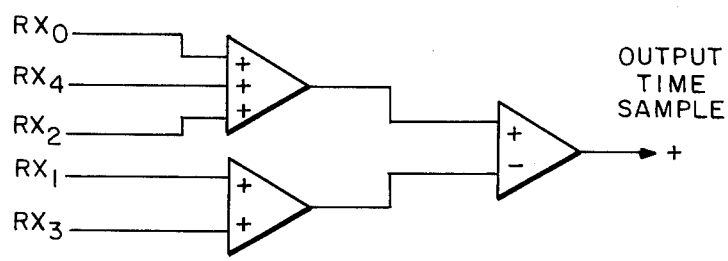
FIG. 3C is a schematic diagram of an analog implementation of the tree graph algorithm of FIG. 3B.

The inverse of the DFT may be performed quite straightforwardly by reversing the DFT of FIG. 2. The tree graph for the IDFT is shown in FIG. 3A where the inputs are the real and imaginary spectral components of the non-redundant vectors $X_n$. In the sliding window sampling of the instant invention, significant circuit simplicity is provided in using only a single output of the IDFT. The simplest approach is to utilize the inverse transforms which require only real inputs thus eliminating complex multiplication. Accordingly, FIG. 3B shows a "sparse" IDFT for the 4th time sampling, and FIG. 3C shows an analog implementation of FIG. 3B. The output signal at the fourth time sampling is representative of the input signal sample $x_3$, for an input sample set $x_0 \ldots x_{N-1}$. A subsequent input sample set is taken later, shifted in time by a fixed amount $t_0$, where generally $0<t_0 \leq (T/N)$ and T is the sample set window, to provide a sample set $x_0 \ldots x_{N-1}$. The fourth output sample is again representative of the fourth input time sampling, namely $x_3$. The input sample is again taken, shifted by $t_0$ and the process repeated to provide a sliding window input. There is therefore a one-to-one correspondence between the number of samples from the IDFT and the number of signal sample sets. Thus, the output signal can be continuous if the input is continuous, as, for example, in utilizing an analog delay line, or the output can be sampled if the input is sampled, as, for example, in utilizing an input shift register.

Figure 4:
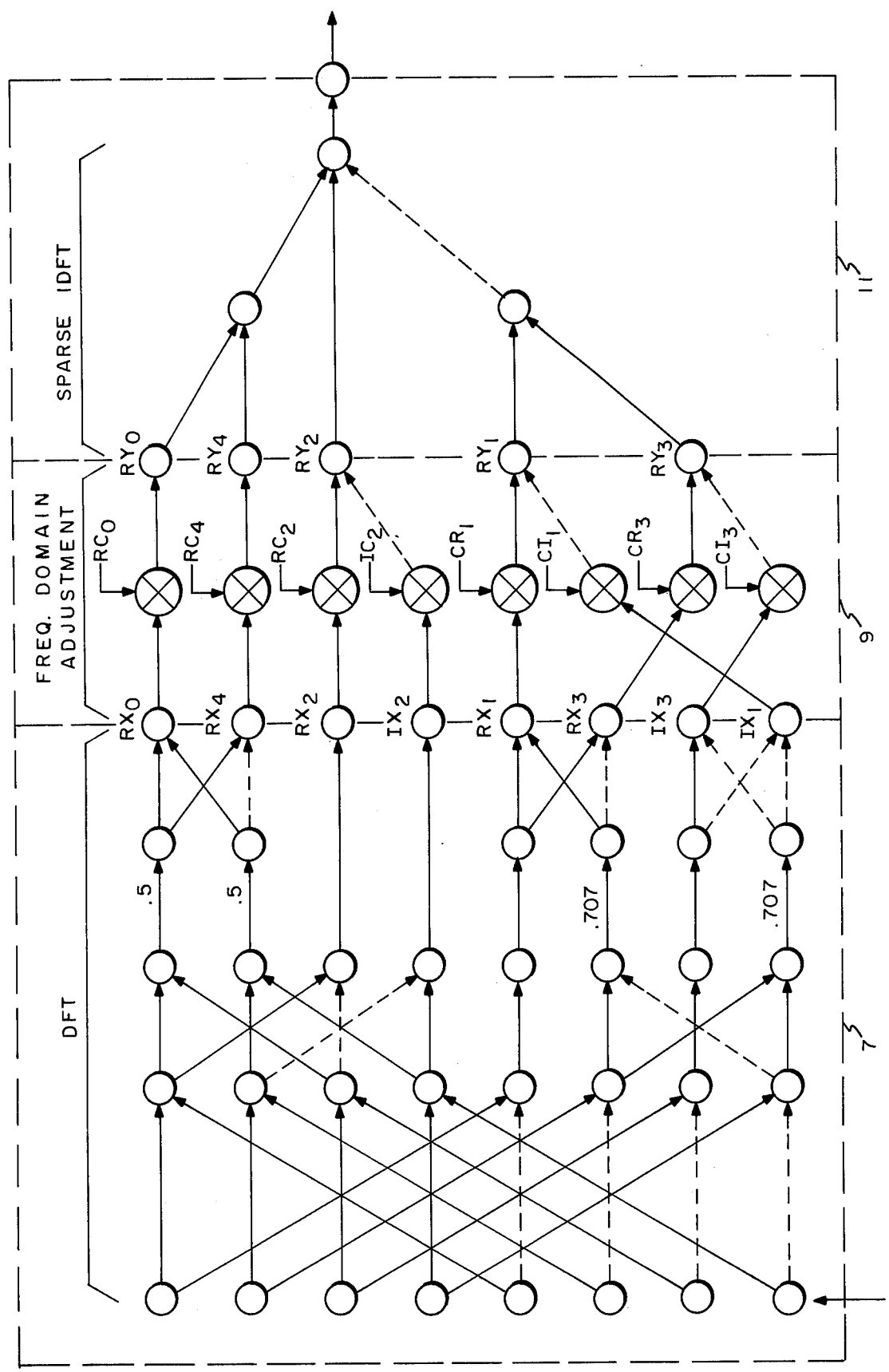
FIG. 4 is a tree graph for the complete equalization.

FIG. 4 illustrates a tree graph for the complete equalization process operating in a running mode. The DFT of the input sample set $x_0 \ldots x_{N-1}$ for $N=8$ is computed in section 7. The frequency domain equalization is computed in section 9 and the inverse DFT in section 11. As is readily apparent, sections 7 and 11 are identical to FIG. 2 and FIG. 3B, respectively. The frequency domain equalization is achieved by multiplying each spectral coefficient $X_n$ by a correction factor $C_n$ which is simply a component of the transfer function of the equalizer $C(w)$. Thus, $$Y_n = X_n \cdot C_n, n = 0, 1 \ldots N/2 \qquad (1)$$

The equalized spectral components, $Y_n$, are then inverse transformed by the IDFT to provide the time domain representation of the input sample set.

The multiplication in equation (1) is performed component by component and may be considered the equivalent of a vector dot product multiplication. Indeed, within the frequency domain, the equivalent transfer function of two transfer functions in series is the component-by-component product of the two functions, and there are no cross products as in the case of convolutions. The multiplication indicated in section 9 of FIG. 4 and by equation (1) is a complex multiplication for complex components $X_1$, $X_2$ and $X_3$ and a simple multiplication for real components $X_0$ and $X_4$. In both cases, however, only the real results of the multiplication, namely $RY_n$, are in fact generated inasmuch as the sparse inverse transform requires only real inputs. Further, the correction factors $C_n$ may be adjusted independently of one another, and only the coefficients $X_n$ and $Y_n$ need be considered when making the adjustment. Thus, there is no requirement for obtaining the system output as is generally true in time domain equalizers. The equalization process of FIG. 4 takes place entirely in the frequency domain and provides an in-line system for automatically equalizing the incoming signals.

In order to determine the desired equalizer transfer function $C(w)$, one may assume that an isolated impulse or test signal of known magnitude and polarity is transmitted. This test signal is transmitted during a training period prior to message transmission. In the following description, test or training signals are sequentially transmitted to set up or initialize the equalizer to provide the components $C_n$. Instead of transmitting separate test pulses, however, a single input sample set may be held in storage and utilized during the adjustment or setup process. In this case, the adjustment steps can be made as rapidly as is consistent with proper operation of the feedback loop circuitry. It is within the scope of this invention to completely adjust the equalizer within one input pulse interval. Inasmuch as convergence is always assured and is not dependent on step size, the steps may be made as large as desired consistent with the accuracy needed in the final setting. Step size is determined by the number of bits in the correction factor word (counter 28 in FIG. 6).

During the adjustment process, the ideal training pulses having known characteristics are transmitted.

The ideal received signal is $h(t)$, the impulse response of $H(w)$. However, the actual received test signal is $f(t)$, the impulse response of $F(w) = H(w) \cdot D(w)$. It is intended that $C(w)$ should equal $1/D(w)$ or be the best approximation possible. For the test pulses $f(t)$, one can write the following for each frequency component $n$:

$$F = RF + jIF$$
$$= (RH + jIH) \cdot (RD + jID)$$
$$= (RHRD - IHID) + j(RHID + RDIH); j = \sqrt{-1} \quad (2)$$

and since, $$C(w) = \frac{1}{D(w)} = \frac{H(w)}{F(w)},$$

then for each component $n$:

$$C = \frac{RH + jIH}{RF + jIF}$$

$$C = \frac{(RH + jIH)(RF - jIF)}{(RF)^2 + (IF)^2}$$

$$C = \frac{RHRF + IHIF}{(RF)^2 + (IF)^2} + j\frac{(RFIH - RHIF)}{(RF)^2 + (IF)^2}$$

The ADFT performed at the receiver can produce a set of coefficients for each input sample set $i$ representing RF and IF at discrete frequencies. Also, since $h(t)$ is known, the coefficients RH and IH at these same frequencies are known. With this information, a sample version of $1/D(w)$ can be produced and used to equalize any signal which is subsequently transmitted through $D(w)$. The equalization function $1/D(w)$ can be written as $1/D(w) = C(w) = RC + jIC$, where $$RC = \frac{RHRF + IHIF}{(RF)^2 + (IF)^2} \quad (3A)$$

$$IC = \frac{RFIH - RHIF}{(RF)^2 + (IF)^2} \quad (3B)$$

The instant invention provides these correction factors by a series of successive approximations. An alternate approach to providing the correction components $C_n$ is by means of a more direct calculation technique and is described in the aforementioned copending application.

Figure 5:
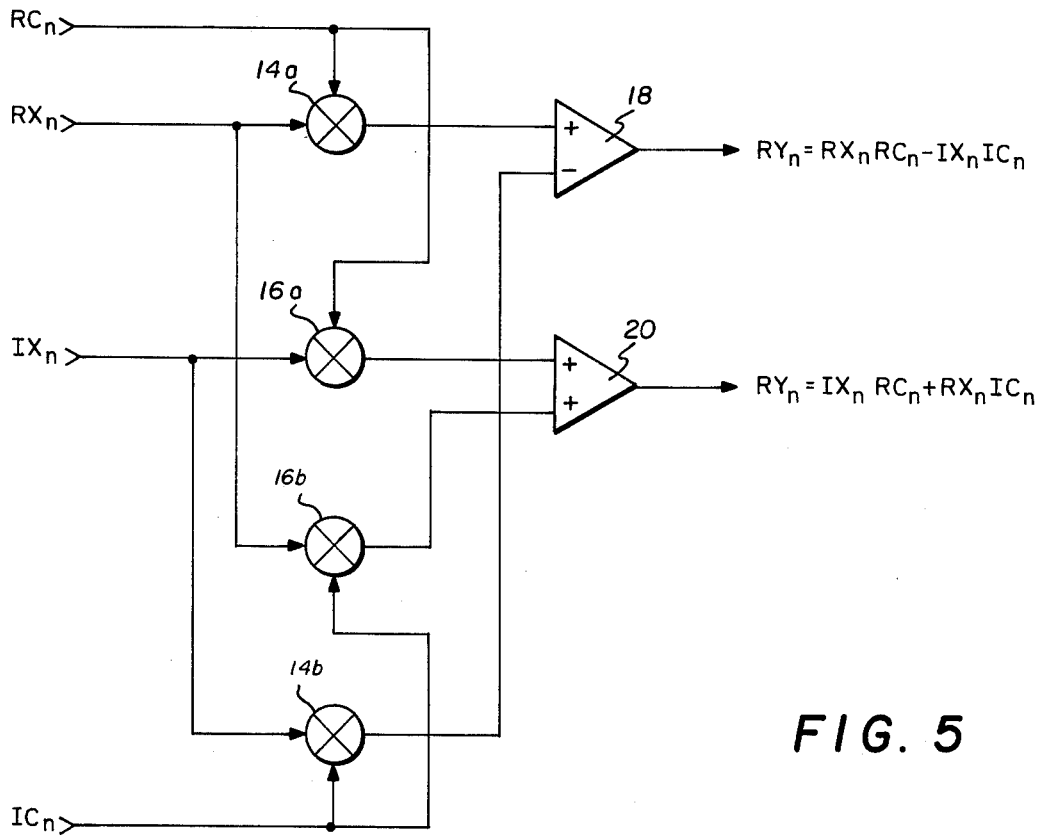
FIG. 5 is a schematic diagram of a complex multiplier used in equalizing the Fourier coefficients of the received signal.

FIG. 5 is a schematic diagram of a complex multiplication apparatus which may be used in equalizing the Fourier coefficients of the received signal according to equation (1). The $n^{th}$ spectral component $X_n$ comprising real and imaginary coefficients $RX_n$ and $IX_n$, respectively, is multiplied by the $n^{th}$ correction factor $C_n$, having the real and imaginary coefficients $RC_n$ and $IC_n$, respectively, as shown in the equation below:

$$Y_n = RY_n + jIY_n = X_n \cdot C_n = (RX_n + jIX_n) \cdot (RC_n + jIC_n) \quad (4A)$$

$$RY_n = RX_n RC_n - IX_n IC_n \quad (4B)$$

$$IY_n = IX_n RC_n + RX_n IC_n \quad (4C)$$

Each of the components $RC_n$ and $IC_n$ is derived during the initial training period wherein $x(t) = f(t)$. FIG. 5 shows the required multiplication as being performed by multipliers 14a, 14b, and 16a, 16b, the outputs thereof being provided to operational amplifiers 18 and 20. During the training period, when $f(t)$ is received, $RC_n$ and $IC_n$ are adjusted such that the outputs $RY_n$ and $IY_n$ of the complex multiplier are simply $RH_n$ and $IH_n$, respectively. When adjustment is complete, the correction factors $RC_n$ and $IC_n$ are those given by equations (3A) and (3B) above. Thus, during the training period, as seen by equation (2), $$RX = RF = RHRD - IHID$$

and $$IX = IF = RHID + RDIH \quad (5)$$

When these values of $RF$ and $IF$ are substituted into equations (3A) and (3B), one obtains:

$$RC = \frac{RD}{RD^2 + ID^2}$$
$$IC = \frac{-ID}{RD^2 + ID^2} \quad (6)$$

When these values of $RC$ and $IC$ as well as the values for $RX$ and $IX$ from equation (5) are substituted into equation (4B), one has, omitting the frequency index $n$, $$RY = (RHRD - IHID)\left(\frac{RD}{RD^2 + ID^2}\right) - (RHID + RDIH)\left(\frac{-ID}{RD^2 + ID^2}\right)$$

$$= \frac{RHRD^2 - IHIDRD + RHID^2 + RDIHID}{RD^2 + ID^2}$$

$$= \frac{RH(RD^2 + ID^2)}{RD^2 + ID^2} = RH$$

Likewise, equation 3C reduces to $$IY = IH$$

These values of $RY$ and $IY$ are the desired values and meet the criteria which stops adjustment. In the instant invention $Y_n$ and $H_n$ are compared in a feedback system and $C_n$ is iteratively adjusted so that $Y_n$ approaches $H_n$ with increasing accuracy.

In utilizing the sparse inverse transform, only the real coefficients $RY_n$ are required as given by equation (4B). Consequently, while it is necessary to utilize the complex multipliers 14a, 14b, 16a and 16b of FIG. 5 to obtain RC and IC (for $X_1$, $X_2$ and $X_3$), it is only necessary to utilize multipliers 14a and 14b (and operational amplifier 18) in the running mode of operation (FIG. 4) once the setup process is complete. Similarly, for real components $X_0$ and $X_4$, it is only necessary to utilize multiplier 14a of FIG. 5 to achieve the multiplication indicated in FIG. 4. As seen below, the multipliers 16a and 16b of FIG. 5 are time shared for $X_1$, $X_2$ and $X_3$ in the adjustment or setup mode of operation, and only the required multipliers 14a and 14b are duplicated for each complex component for use in the running mode of operation. For real components, multiplier 14a is duplicated for each component as used in the setup and running modes of operation.

Figure 6A:
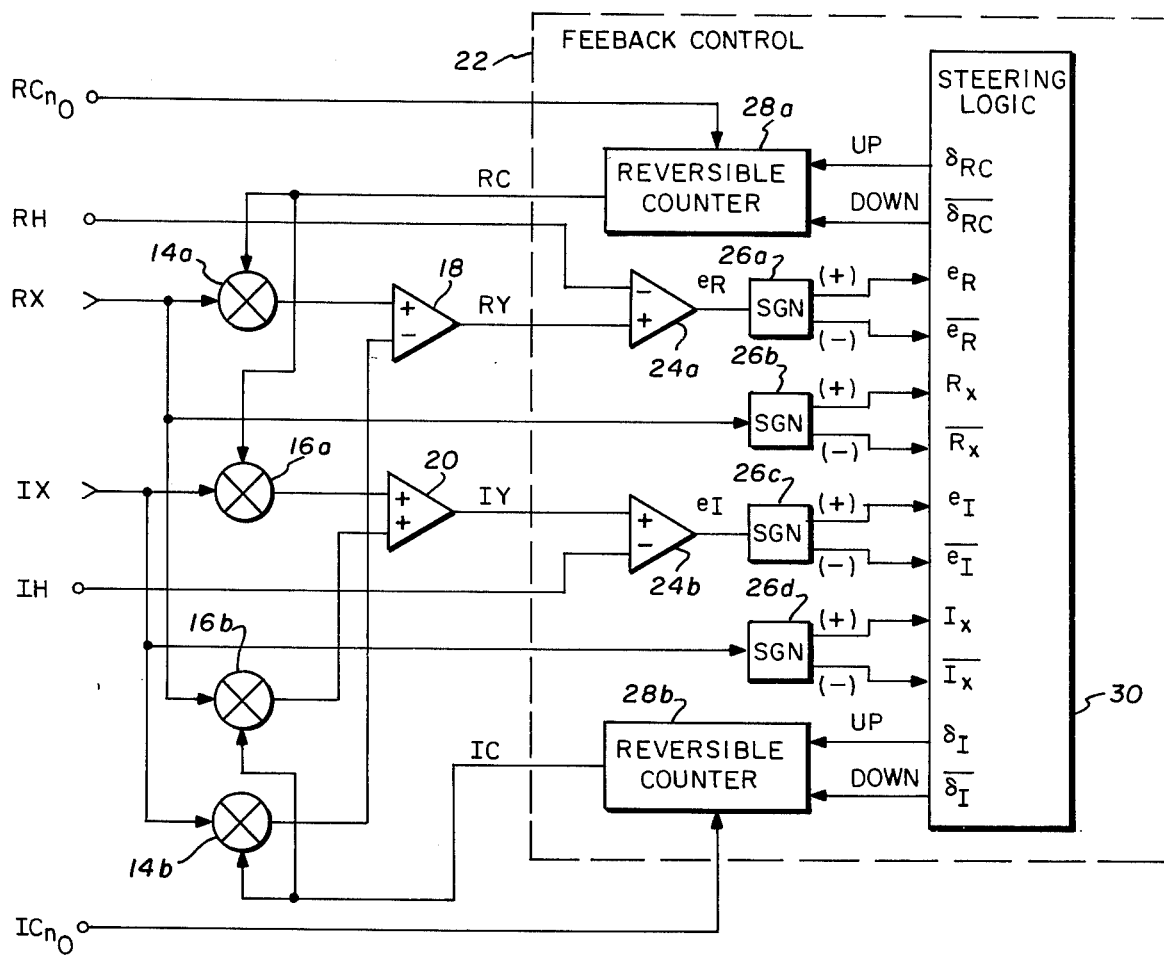
FIGS. 6A and 6B are block schematic diagrams of the invention using complex and simple multipliers in a feedback circuit.

FIG. 6A is a block schematic diagram showing the complex multiplier of FIG. 5 in a feedback circuit. Multipliers 14 and 16 together with operational amplifiers 18 and 20 form the complex multiplication of X and C as in FIG. 5. The outputs of operational amplifiers 18 and 20 are now fed to a feedback circuit 22 which comprises difference amplifiers 24a and 24b, sign generators 26a–26d, reversible counters 28a and 28b, and steering logic circuit 30. The circuitry of FIG. 6 must, in general, be repeated for each frequency component n, or, alternatively, as set forth below, circuit elements may be time shared. For simplicity, the frequency index n has been omitted although it is understood that signals RY, RX, RC, IY, etc., all are associated with a particular frequency, i.e., RY is $RY_n$.

Figure 6B:
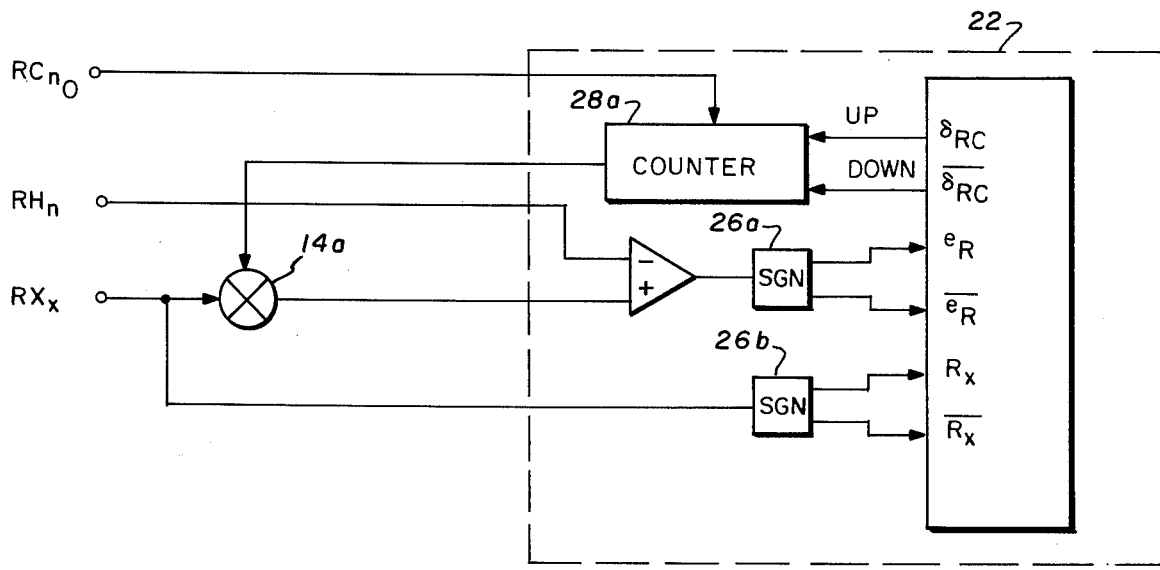

FIG. 6B is a simplified version of FIG. 6A of the case of real coefficients $n=0$ and $n=4$. In this case, only multiplier 14a is needed, and this multiplier is used both during the setup and running modes of operation.

The product output signals RY and IY are fed to difference amplifiers 24a and 24b, respectively, where they are compared with reference signals RH and IH. These reference signals may be provided as outputs of potentiometers (not shown), which are calculated and set off-line to correspond to the ideal or undistorted transfer function H of the transmission channel. Error signals $e_R$ and $e_I$ are provided as outputs from difference amplifiers 24a and 24b. A distinctive feature of the invention is the utilization of only the polarity or sign of the error signals together with the sign of RX and IX to determine whether the correction signals RC and IC should be incremented or decremented. Thus, sign generators 26a and 26c provide outputs indicative of the sign of $e_R$ and $e_I$, respectively, and sign generators 26b and 26d provide outputs indicative of the sign of RX and IX, respectively. These sign generators 26a–26d may, for example, comprise slicing circuits, which slice at zero signal level and produce "true" or "false" (positive and negative) levels. The polarity information of $e_R$, $e_I$, RX and IX is fed to steering logic circuit 30, which is shown in detail in FIGS. 7 and 8. The output of the steering logic circuit 30 is a logic signal $\delta_{RC}$ and $\delta_{IC}$ for incrementing counters 28a and 28b or a logic signal $\overline{\delta}_{RC}$ and $\overline{\delta}_{IC}$ for decrementing counters 28a and 28b. The counters 28a and 28b thus provide the correction signal RC and IC to multipliers 14 and 16. The values of the correction signals RC and IC are continually adjusted until the outputs $RY = RH$ and $IY = IH$, which occurs when RC and IC are given by equations (3A) and (3B). Initial values $RC_{no}$ and $IC_{no}$ of the correction signal are fed to reversible counters 28a and 28b to speed convergence. These values may represent some compromise or approximate equalization known from experience or they may simply be chosen to produce no equalization, e.g., $RC_{no} = 1$, $IC_{no} = 0$. These initial values may be taken from potentiometers (not shown) as is the case with $RH_n$ and $IH_n$.

The instant invention facilitates the utilization of logic circuitry in the feedback control apparatus 22 by developing the required correction multipliers in an incremental fashion using small, fixed increments. This concept permits the examination only of the polarity of the input signals corresponding to RX and IX and the polarity of error signals $e_R$ and $e_I$. The polarity logic or steering logic results in still further simplification of logic circuitry.

When the correction values RC and IC are equal to the values shown in equations (3A) and (3B), these values are stored and used as inputs to multipliers 14 and 16 during transmission of the message signal $x(t)$.

The requirements for the steering logic circuit 30 may be seen from the following analysis given for complex components $X_n$.

From equations (3B) and (3C), it can be seen that if RC is changed incrementally by $\delta_{RC}$, then the outputs, Y, change according to:

$$\Delta RY = \delta_{RC} RX$$

$$\Delta IY = \delta_{RC} IX,$$

where the subscripts n have been omitted for clarity. If IC is changed incrementally by $\delta_{IC}$, then the outputs change according to:

$$\Delta RY = -\delta_{IC} IX$$

$$\Delta IY = \delta_{IC} RX$$

The output changes should be opposite in polarity from the output errors, in order for the process to converge on the correct settings. If one defines the output error $e_R$ and $e_I$ to be given by:

$$e_R = (RY - RH)$$
$$e_I = (IY - IH)$$

then for changes in RC, one can write:

$$SGN\ e_R = -SGN(\delta_{RC} \cdot RX) = -(SGN\delta_{RC})(SGN\ RX)$$

$$SGN\ e_I = -SGN(\delta_{RC} \cdot IX) = -(SGN\delta_{RC})(SGN\ IX)$$

or $$SGN\delta_{RC} = -(SGN\ e_R)(SGN\ RX)$$

$$SGN\delta_{RC} = -(SGN\ e_I)(SGN\ IX)$$

Similarly, for changes in IC $$SGN\ e_R = SGN\ (\delta_{IC} \cdot IX)$$

$$SGN\ e_I = -SGN\ (\delta_{IC} \cdot RX)$$

or $$SGN\delta_{IC} = (SGN\ e_R)(SGN\ IX)$$

$$SGN\delta_{IC} = -(SGN\ e_I)(SGN\ RX)$$

The pair of equations for $SGN\delta_{RC}$ must be satisfied simultaneously, as must be equations for $SGN\delta_{IC}$. It is simpler to summarize the conditions under which these equations are satisfied with Boolean equations wherein positive variable are said to be true and negative are false. The equations are written with + designating a logical "OR", "." designating a logical "and", and the bar − designating a logical "not". Then, $$\delta_{RC} = RX \cdot IX \cdot \overline{e_R} \cdot \overline{e_I} + \overline{RX} \cdot \overline{IX} \cdot e_R \cdot e_I + RX \cdot \overline{IX} \cdot \overline{e_R} \cdot e_I + \overline{RX} \cdot IX \cdot e_R \cdot \overline{e_I}$$

$$\overline{\delta_{RC}} = RX \cdot IX \cdot e_R \cdot e_I + \overline{RX} \cdot \overline{IX} \cdot \overline{e_R} \cdot \overline{e_I} + RX \cdot \overline{IX} \cdot e_R \cdot \overline{e_I} + \overline{RX} \cdot IX \cdot \overline{e_R} \cdot e_I$$

$$\delta_{IC} = RX \cdot IX \cdot e_R \cdot \overline{e_I} + \overline{RX} \cdot \overline{IX} \cdot \overline{e_R} \cdot e_I + RX \cdot \overline{IX} \cdot \overline{e_R} \cdot \overline{e_I} + \overline{RX} \cdot IX \cdot e_R \cdot e_I$$

$$\overline{\delta_{IC}} = RX \cdot IX \cdot \overline{e_R} \cdot e_I + \overline{RX} \cdot \overline{IX} \cdot e_R \cdot \overline{e_I} + RX \cdot \overline{IX} \cdot e_R \cdot e_I + \overline{RX} \cdot IX \cdot \overline{e_R} \cdot \overline{e_I}$$

These equations represent the steering logic required in the feedback control system of FIG. 6A. The logic decision tree of FIG. 7A indicates the decision made for each of the sixteen possible combinations of four "variables". An implementation of the decision tree is shown in FIG. 7B, where a plurality of AND gates 32 and OR gates 34 perform the decision of FIG. 7A responsive to the binary variables representing the signs of RX, IX, $e_R$ and $e_I$. The circuit of FIG. 7B responding to specific combinations and situations effectively steers a pulse to increment the proper multiplier. If $\delta_{RC}$ is true (positive) RC is made incrementally more positive (less negative). If $\delta_{RC}$ is false (negative), RC is made incrementally more negative (less positive). A similar relation exists between $\delta_{IC}$ and IC.

It is noted that only one of the four outputs can occur at the same time, i.e., either the real multiplier, RC, is increased or decreased, or the imaginary multiplier, IC, is increased or decreased.

Figure 7A:
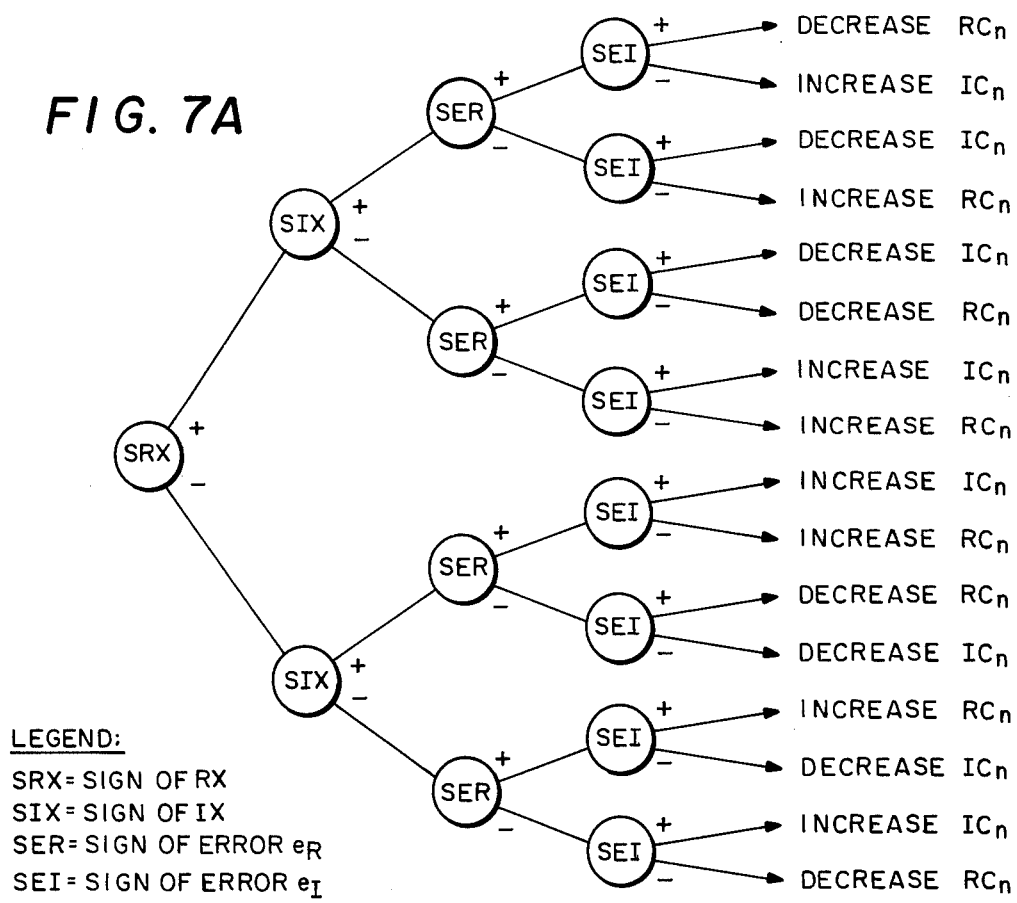
FIG. 7A is a symbolic schematic of the steering logic of FIG. 6A for complex spectral components.
Figure 7C:
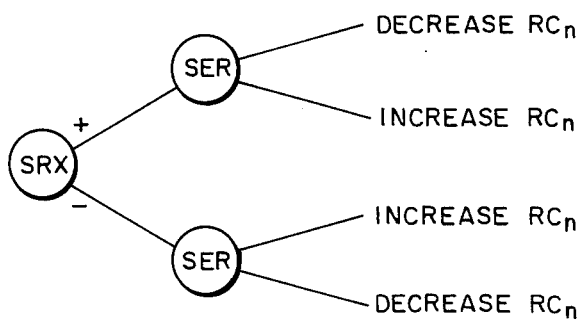
FIG. 7C is a symbolic schematic diagram of the steering logic of FIG. 6A for real spectral components.
Figure 7D:
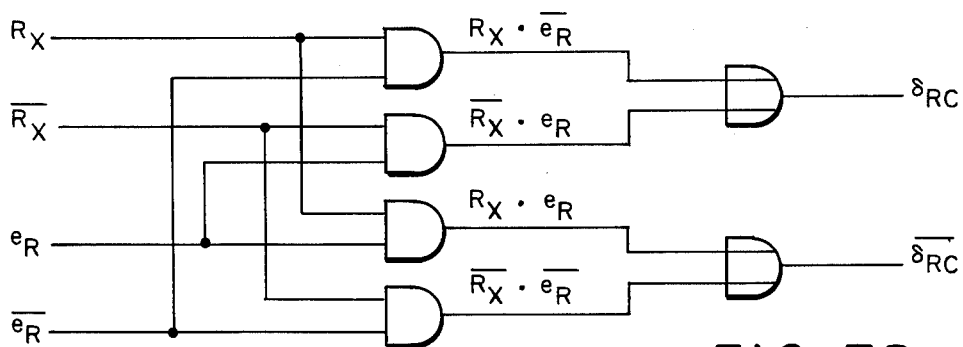
FIG. 7D is a logic schematic representation of the steering logic of FIG. 7C.
Figure 7B:
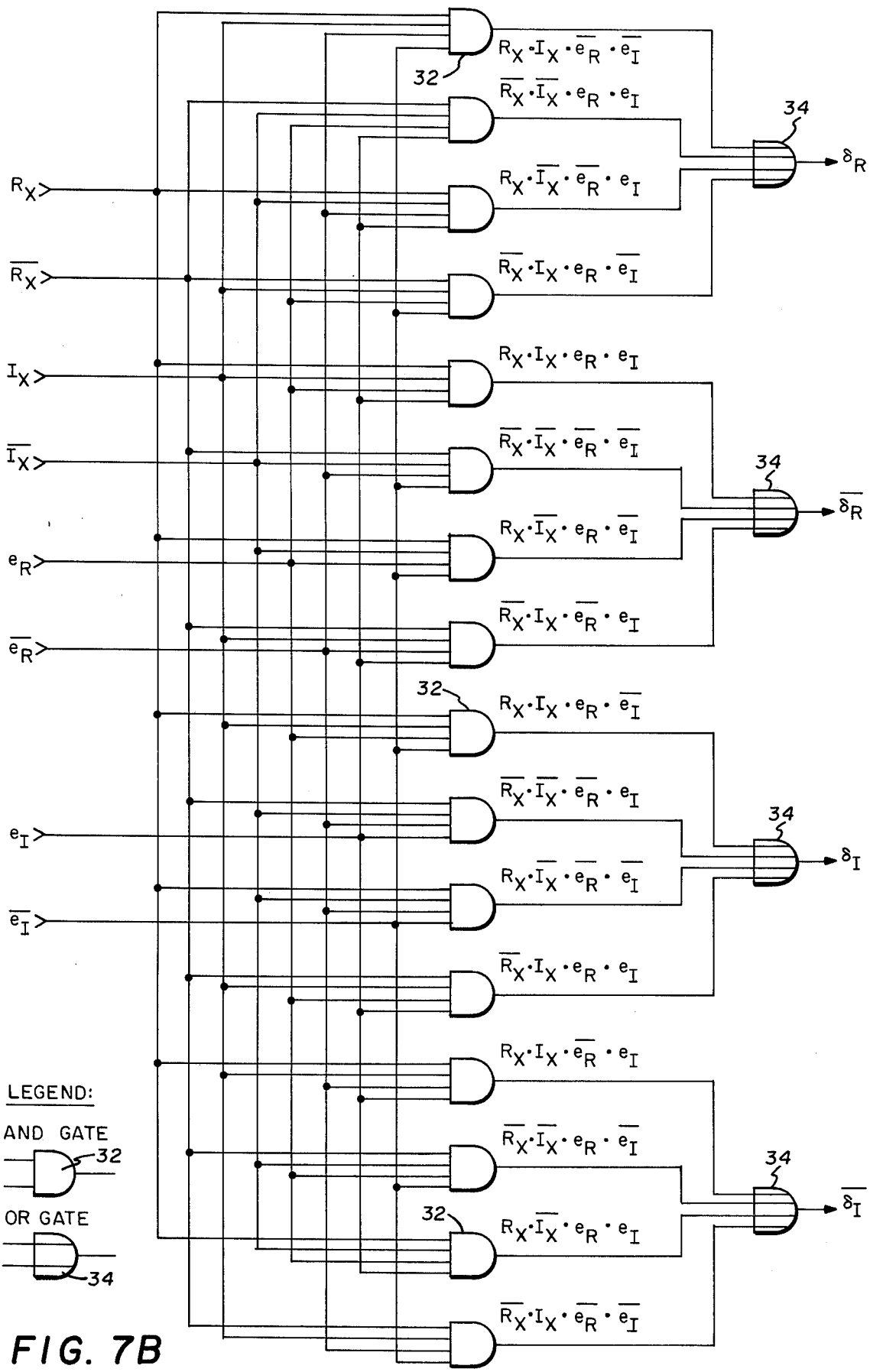
FIG. 7B is a logic schematic representation of the steering logic circuit of FIG. 7A.

FIG. 7C illustrates the logic decision tree for the simpler cases n=0 and n=4 in which the spectral components have only real coefficients. FIG. 7D shows the hardware steering logic corresponding to FIG. 7C.

The sign generators 26a–26d, which produce the sign information, will always have an output either positive or negative. Consequently, the steering logic will always have an output and the multipliers will be incremented continually. The system will thus hunt around the correct values even after they have been properly achieved. The error due to such hunting depends on the size of the increments $\delta_{RC}$ and $\delta_{IC}$.

Hunting may be avoided or minimized by employing error signal slicers, which have a null zone or deadband around zero level. When both error signals fall within the null zone, further incrementing of the multipliers is inhibited. The cessation of incrementation may also be used to provide a convenient indication that the setup process is complete.

When the setup or initialization process is complete using the ideal test pulse, the output real coefficient RY equals the reference real coefficient RH, and the output imaginary coefficient IY equals the reference imaginary coefficient IH. Moreover, the real multiplier RC equals the real part, and the imaginary multiplier IC equals the imaginary part of the inverse of the complex quantity representing the distortion transfer function, D(w), which was a factor of the input along with the complex quantity H(w) representing the reference channel transmission function. Thus, when the multiplier settings are retained in appropriate storage means after the initial training period, the feedback control may be disabled and the equalizer will cancel the distortion factor from any complex input. the circuitry operates to equalize the discrete frequency components transmitted through the same distortion.

Figure 8A:
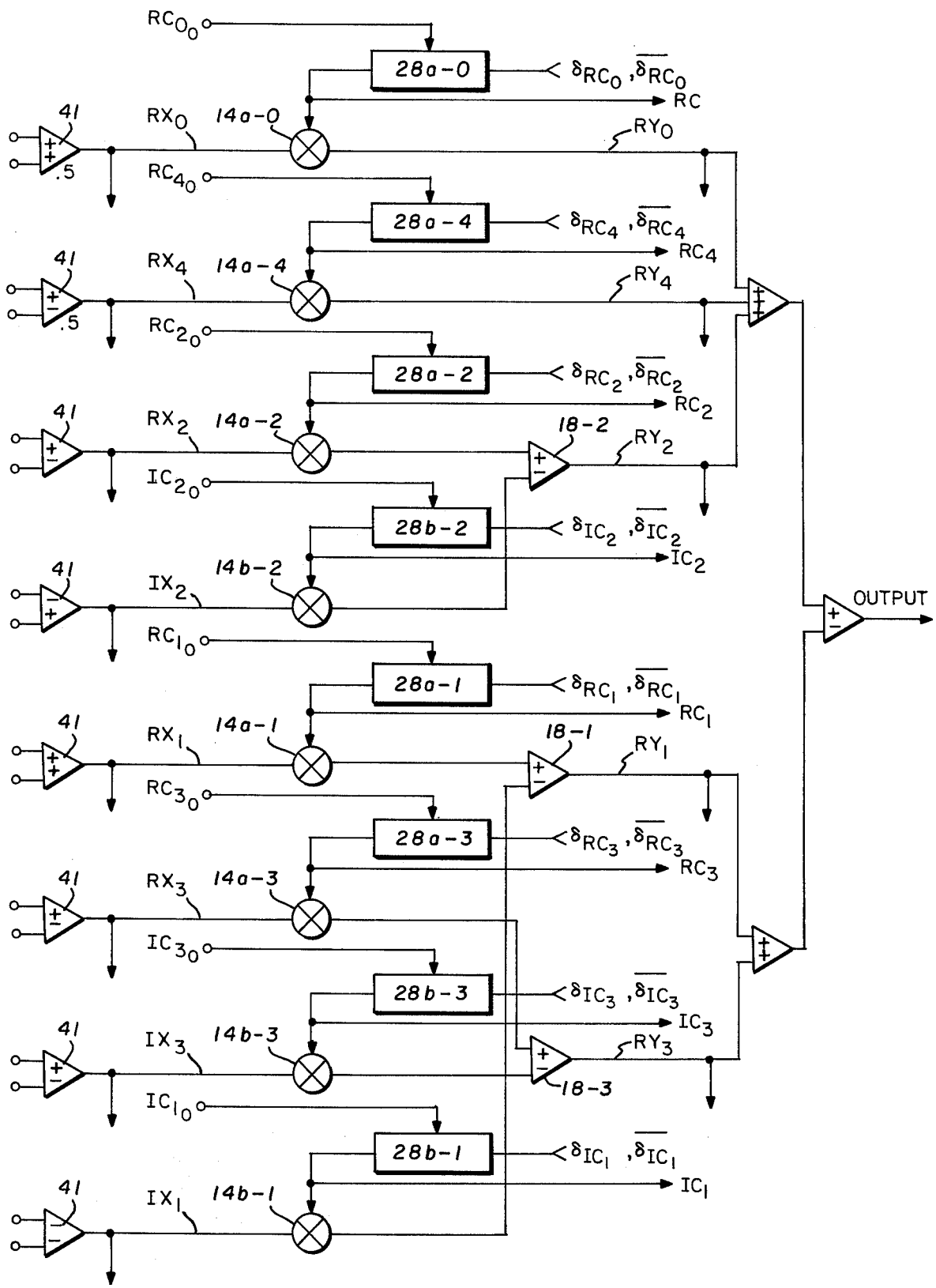
FIGS. 8A and 8B show the use of the invention in a frequency domain equalization system.
Figure 8B:
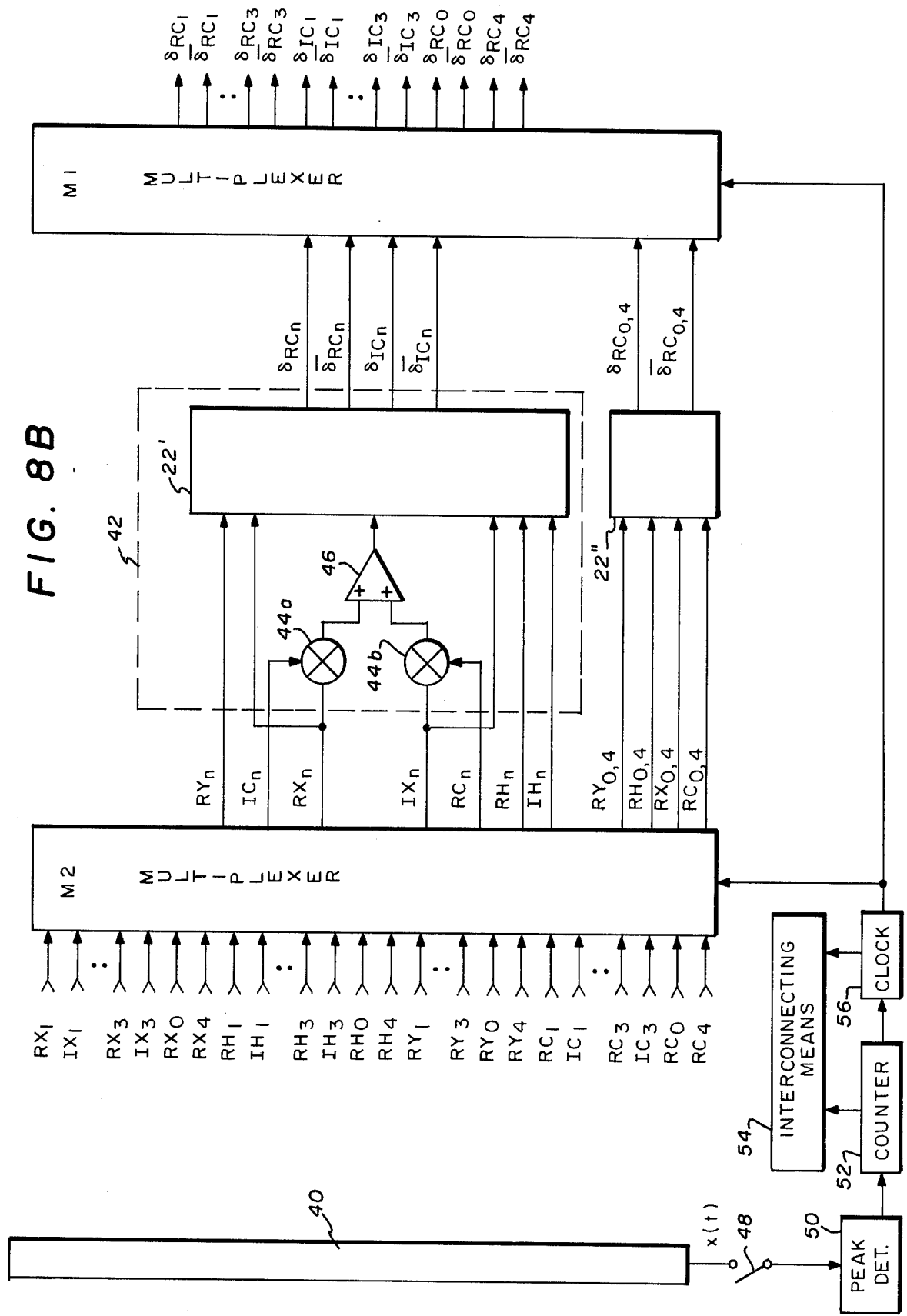

The circuitry shown in FIGS. 8A and 8B, when joined as indicated by the identically referenced leads, represents the implementation of the flow diagram of FIG. 4 and incorporates therein the circuits of FIG. 3C, 6A and 7. Specifically, the input sample data is taken from a delay line 40 and sample sets $i$, $i+1$, ... are taken to provide the sliding window. During message reception, the DFT, frequency adjustment and sparse inverse DFT are performed for each sample set $i$, $i+1$ ... Operational amplifiers 41 are similar to those shown in FIG. 2, and the output signals corresponding to the discrete frequency components of the transform X are provided as inputs to the equalizer proper. A single time-shared circuit 42 is used by all complex frequency components and comprises multiplier 44a, 44b, operational amplifier 46 and feedback control apparatus 22'. Multipliers 44a and 44b together with operational amplifier 46 correspond respectively to multipliers 16a, 16b and operational amplifier 20 of FIG. 6A. Other circuit elements corresponding to FIGS. 6A and 6B are appropriately labeled, but now the frequency index $n$ is provided as a suffix. Using the time-shared circuit 42, it is only necessary to provide separately, for each component circuit elements corresponding to multipliers 14a, 14b operational amplifiers 18 and reversible counters 28a and 28b. It is noted that the feedback circuit 22' is the same as feedback circuit 22 of FIG. 6 except that reversible counters 28a and 28b are now omitted. These counters are now duplicated separately for each component as shown in FIG. 8. Consequently, the outputs of the steering logic 30 of feedback circuit 22' are fed to appropriate up/down counters 28a–n and 28b–n via a multiplexer M1. The inputs $RX_n$, $IX_n$, $RH_n$, $IH_n$, $RY_n$, $RC_n$, $IC_n$ to time-shared circuit 42 are provided from another multiplexer M2. For real components $n=0$ and $n=4$, a separate feedback circuit 22'' is provided. Thus, feedback circuit 22' corresponds to the logic circuit shown in FIGS. 6A and 7B (without counters 28), and feedback circuit 22'' corresponds to the logic circuit shown in FIGS. 6B and 7D (without counter 28). For real components, the time-shared circuit 42 is bypassed, and the feedback circuit 22'' is interconnected directly between multiplexers M1 and M2. The interconnecting lines are labeled with the subscript "0,4" to indicate that $n$ sequentially takes on its two values 0 and 4. Thus, the line labeled "$RY_{0,4}$" stands for an interconnecting line carrying signal coefficient value $RY_0$ or $RY_4$.

Multiplexers M1 and M2 are controlled by an initializing circuit means comprising setup switch 48, peak detector 50, counter 52, interconnection means 54 and clock means 56. Switch 48 is closed during the training or setup period and, upon detection of the incoming signal $f(t)$ in peak detector 50, counter 52 is actuated to provide a delay so that the equalization will be effective when the peak of the training pulse is near the center of delay line 40. Counter 52 triggers the interconnection means 54 and clock means 56 to actuate multiplexers M1 and M2 and provide their interconnection to the other indicated circuit elements. Interconnection means 54 may comprise switching devices, such as transistors or other solid state devices, together with connecting lines so as to provide the necessary wire connections.

Thus, in the running mode, the incoming message signal $x(t)$ is sampled to produce the samples $x_k$ where $k=0\ldots N-1$. The samples $x_k$ are transformed by a DFT to provide spectral components $X_n$ for $n=0\ldots N-1$. The spectral components are equalized to produce equalized spectral components $Y_n = C_n \cdot X_n$, $n=0\ldots N-1$ and the inverse DFT is taken for $Y_n$ to produce a single time domain output sample $y_k$ corresponding to the original input sample $x_k$. Employing non-redundant frequency components for the discrete Fourier transforms, where N is an even interger and $x(t)$ and $f(t)$ are real, simplifies the equalization in that circuitry need only be provided for $N/2$ spectral components. Thus, the DFT circuitry provided components $X_n$ for $n=0, 1\ldots N/2$. Similarly, the components $C_n$ and $Y_n$ need only be provided for $n=0, 1\ldots N/2$. Sliding window sampling of the input signal $x(t)$ wherein samples are taken every $T/N^{th}$ interval along the delay line 5 (FIG. 2), allows utilizing a single output from the sparse IDFT corresponding to each sample set for each window. Consequently, N output signals are provided at the output of the IDFT for each N input sample set. The sliding window technique is appropriate as opposed to a complete replacement of $x_0\ldots n_{N-1}$ inasmuch as multiplication in the frequency domain corresponds to a convolution in the time domain, and for the DFT, convolutions are circular rather than linear. See, for example, *Digital Signal Processing* by Oppenheim and Schafer, Prentice-Hall, 1975.

During the training period, the correction values RC and IC are produced by feedback adjustment for each channel, N, to satisfy equations (3A) and (3B). Thus, reversible counter 28$a$–0 having an initial value $RC_{00}$ ($RC_{n0}$ where $n=0$) is successively incremented or decremented to approach, within the slicer deadband, the equalization value of equations (3A) and (3B). For complex components, $n=2$, for example, the reversible counters 28$a$–3 and 28$b$–3 having initial values $RC_{30}$ and $IC_{30}$ are each adjusted so that $RC_3$ and $IC_3$ satisfy equations (3A) and (3B). After all channels $n$ have the equalization values of $RC_n$ and $IC_n$ stored in their respective counters or storage means, setup switch 48 is opened, and the equalizer is ready to receive message signals $x(t)$. Each spectral coefficient $X_n$ of the message signal is now multiplied by the equalization values of $RC_n$ and $IC_n$ ($RC_n$ only for $n=0,4$) stored in reversible counters 28$a$–$n$ and 28$b$–$n$. The coefficients $Y_n$ are thus frequency equalized and given by $Y_n = C_n \cdot X_n$ as desired. The sparse IDFT of the set $Y_n$ produces the desired output time sample $y_k$.

It is noted that in a facsimile system, the sync pulses used to achieve line synchronization of the scanning and printing mechanism can provide an ideal set of known pulses for the purpose of setting up the automatic equalizer. Furthermore, if the sync pulses are continued throughout the transmission of facsimile information, the automatic equalizer settings can be regularly updated. The system can thus be adaptive in the sense that the equalizer can be made to track changes in channel characteristics which occur during the transmission of a document.

In utilizing an analog tapped delay line to provide the input sets $x_k$, the equalizer bandwidth is determined by the tap spacing, $\tau = T/N$ and is $BW = \frac{1}{2}\tau = N/2T$. In such systems, filtering may be used to limit the bandwidth of the incoming signal to BW to avoid aliasing. Images do not occur in an analog delay line since samples are continuously available and the sampling rate may be thought of as infinite. If the input sample set is taken from stages of a shift register, for example, the sampling rate must be at least the Nyquist rate to avoid aliasing. It is important to note that the input sampling rate may not necessarily be the same as the sampling rate seen by the DFT since one could connect, for example, every other stage of the input shift register to the DFT input circuitry. The input sampling rate determines the rate at which the output samples appear and the image points of the output signal spectrum. The transform sampling rate determines the equalizer transfer function which is continuous in the analog delay line case since the transform sampling frequency, N/T, is twice the bandwidth $BW = N/2T$. The equalization transfer function may also be made continuous with shift registers or sample and holding circuits at the input if the transform sample interval is taken at T/N seconds using a total of $N$ inputs. If the number of samples taken during time $T$ is $N$, then the equalization will exactly cancel the distortion at N/2 positive frequencies, plus dc, evenly spaced by $1/T$, and the impulse response of the equalized system will be exactly correct at $N$ equally spaced points. This type of equalizer is thus ideally suited to digital transmission; however, the equalization function will be a smooth curve between the sample frequencies so that it is also well suited for non-digital transmission such as facsimile and video. Thus, although control of the equalizer occurs at discrete points, the transfer function itself is continuous from dc to $BW = N/2T$ and beyond, as an image, where $T/N$ is the transform sample spacing. The response in between the control frequencies is a result of the continuous "windowing" in the time domain.

If the sample set does not include all the non-zero samples of the unequalized system response, then the equalization between the sample frequencies will not be good enough to eliminate intersymbol interference in the digital sense. If the samples are not close enough, the equalization bandwidth will be too narrow. The equalization function is periodic in the frequency domain with period of $1/\tau$. The sample spacing is easily changed without changing the system complexity. However, if the number of samples is increased, the circuit complexity increases faster than linearly, since the number of nodes in the discrete Fourier transform algorithm used is $N \log_2 N$.

While the invention has been described with reference to a particular embodiment thereof, it is apparent that modifications and improvements may be made by those of skill in the art without departing from the spirit and scope of the invention.

What is claimed is:

1. A frequency domain equalizer for automatically equalizing the spectral components of a received signal transmitted through a distortion affected transmission channel comprising:
   a. multiplying means for performing a complex multiplication of a complex input signal X and a complex multiplicand correction signal C, said multiplying means generating a complex product signal Y, said input signal X having a first factor, D, corresponding to a distortion transfer function of said transmission channel, and a second factor, H, corresponding to an undistorted transfer function of said transmission channel;
   b. feedback control means receiving said complex product signal Y for generating a value of said correction signal C which is approximately inversely proportional to said first factor D of said multiplier input signal X;
   c. said feedback control means comprising:
      1. reference means for generating a complex reference signal proportional to said second factor, H, of said input signal X;
      2. means for comparing said product signal Y with said reference signal;
      3. means for generating error signals having an algebraic sign corresponding to the difference between said compared product signal Y and said reference signal;
      4. means for adjusting the value of said correction signal C to produce a value for said product signal Y approximately equal to said reference signal; and
      5. said adjusting means responsive to the algebraic sign of said error signals and the algebraic sign of real and imaginary components of said input signal X.

2. A frequency domain equalizer as recited in claim 1 wherein said adjusting means comprises:
   a. reversible counter means for generating values of said correction signals C and
   b. steering logic means responsive to the algebraic sign of said error signals and the algebraic sign of real and imaginary components of said input signal X for incrementing and decrementing said reversible counter means.

3. A frequency domain equalizer as recited in claim 2 wherein said steering logic means is responsive solely to the algebraic sign of said error signals and the algebraic sign of the real and imaginary components of said input signal X.

4. A frequency domain equalizer as recited in claim 2 further comprising means for detecting the algebraic sign of said error signals and said real and imaginary components of said input signal X.

5. A frequency domain equalizer as recited in claim 4 wherein said sign detecting means comprises slicing circuits.

6. A frequency domain equalizer as recited in claim 4 wherein said sign detecting means has a deadband at a zero level.

7. A frequency domain equalizer as recited in claim 1 wherein said multiplying means and said feedback control means are operable for a plurality of complex spectral components $X_n$, where $X_n$ is any given component of said input signal and $n$ is an integer.

8. A frequency domain equalizer as recited in claim 7 wherein a single feedback control means is time shared by at least one of said channels $n$.

9. A frequency domain equalizer as recited in claim 8 wherein said multiplying means comprises a plurality of separate multipliers and at least some of said multipliers are time shared together with said feedback control means.

10. A frequency domain equalizer as recited in claim 7 wherein said spectral components $X_n$ correspond to the discrete Fourier transformation of a time dependent received signal $x(t)$ and said equalizer comprises means for generating the discrete Fourier transform components $X_n$ of said received signal $x(t)$.

11. A frequency domain equalizer as recited in claim 10 further comprising means for sampling said input signal $x(t)$ for providing a sample set $x_k$, $k=0, 1 \ldots N-1$, where $N$ is an integer, and said means for generating the discrete Fourier transform components $X_n$ comprises means for generating N components where $n=0, 1 \ldots N-1$.

12. A frequency domain equalizer as recited in claim 11 wherein $x(t)$ is real and N is an even integer and $n$ has values in one of the groups consisting of $n=0, 1 \ldots N/2$ and $n=0, n/2, (N/2)+1 \ldots N-1$.

13. A frequency domain equalizer as recited in claim 12 wherein said equalizer further comprises means for generating the inverse discrete Fourier transform of a plurality of product signals $Y_n$.

14. A frequency domain equalizer for automatically equalizing the discrete Fourier coefficients $X_n$ of a received electrical signal $x(t)$ transmitted through a transmission channel comprising:
   a. means for sampling a test pulse transmitted through said transmission channel for providing a discrete set of test sample values $f_k$, where $k=0, 1 \ldots N-1$, and N is an integer;
   b. means for calculating the discrete Fourier transform of said test sample values $f_k$ to provide the discrete Fourier coefficients $F_n$, $n=0, 1 \ldots N-1$;
   c. means for providing reference values $H_n$ representing the discrete Fourier coefficients corresponding to an ideal, undistorted test pulse;
   d. feedback control means for generating a correction factor $C_n$ for each value $F_n$ such that $$C_n \cdot F_n = H_n,$$

said feedback control means comprising logic circuit means responsive to the algebraic sign of real and imaginary components of said coefficients $F_n$;
   e. means for storing said generated correction factors $C_n$;
   f. means for subsequently sampling said received electrical signal $x(t)$ to provide a discrete set of signal sample values $x_k$, $k=0, 1 \ldots N-1$;

g. means for calculating the discrete Fourier transform of said signal sample values $x_k$ to provide the discrete Fourier coefficients $X_n$;

h. means for multiplying $X_n$ by the stored correction factors $C_n$ to produce the frequency equalized coefficients $Y_n$ for $n=0, 1 \ldots N-1$ where $$Y_n = C_n \cdot X_n, \text{ and}$$

i. means for generating the inverse discrete Fourier transform of the coefficients $Y_n$ to provide an output signal in the time domain corresponding to said received electrical signal.

15. A frequency domain equalizer as recited in claim 14 wherein said feedback control means further comprises:

a. means for comparing the product $C_n \cdot F_n$ with the value $H_n$;

b. means for generating an error signal having a polarity determined by the algebraic sign of the difference between said compared product $C_n \cdot F_n$ and $H_n$; and c. said logic circuit means responsive to the algebraic sign of said error signal.

16. A frequency domain equalizer as recited in claim 15 wherein said logic circuit means is responsive solely to the algebraic sign of said error signal and the algebraic sign of real and imaginary components of said coefficients $F_n$.

17. A frequency domain equalizer as recited in claim 16 wherein said received electrical signal $x(t)$ is real, N is an even integer having values in one of the group $n=0, 1 \ldots N/2$ and $n=0, N/2, N/2+1 \ldots N-1$, and said means for generating the inverse discrete Fourier transform comprises means for generating a sparse inverse discrete Fourier transform having only real components of $Y_n$ as an input thereof.

18. A frequency domain equalizer as recited in claim 17 wherein said output signal from said means for generating said sparse inverse discrete Fourier transform comprises a single output value of said discrete signal sample values $x_k$, $k=0, 1 \ldots N-1$.

19. A frequency domain equalizer as recited in claim 18 wherein said means for sampling said signal $x(t)$ comprises means for providing N samples $x_k$ of said signal $x(t)$, each sample spaced a time interval T/N apart, where T is the period of a sample set.

20. A frequency domain equalizer as recited in claim 19 further comprising an input analog delay line for receiving said signal $x(t)$, said delay line having taps spaced apart at time intervals T/N.

21. A frequency domain equalizer as recited in claim 19 further comprising means for time shifting said signal $x(t)$ to provide different discrete sets of signal sample values $x_k$, each set time displaced by an amount T/N, whereby a sliding window sampling of said received signal $x(t)$ is provided.

22. A frequency domain equalizer as recited in claim 14 wherein said means for generating $C_n$ comprises means for generating the real, R, and imaginary, I, parts of $C_n$, in terms of the real and imaginary parts of $H_n$ and $F_n$ as follows:

$$RC_n = \frac{RH_n \cdot RF_n + IH_n \cdot IF_n}{(RF_n)^2 + (IF_n)^2}$$

$$IC_n = \frac{RF_n \cdot IH_n - RH_n \cdot IF_n}{(RF_n)^2 + (IF_n)^2}$$

23. A frequency domain equalizer as recited in claim 22 wherein said means for generating $C_n$ comprises a time-shared circuit for calculating $C_n$ for $n=1 \ldots N/2-1$, where N is an even integer.

24. A frequency domain equalizer as recited in claim 14 wherein said means for calculating the discrete Fourier transform of $f_k$ and $x_k$, said correction factors $C_n$, and said inverse discrete Fourier transform of $Y_n$ comprises analog circuit means.

25. A method of equalizing the discrete Fourier coefficients $X_n$ of a received signal $x(t)$ transmitted through a transmission channel comprising the steps of:

a. sampling a test pulse transmitted through said transmission channel for providing a discrete set of test sample values $f_k$ where $k=0, 1 \ldots N-1$ and N is an integer;

b. generating the discrete Fourier transform of the test sample values $f_k$ to provide discrete Fourier coefficients $F_n$, $n=0, 1 \ldots N/2$;

c. providing reference values $H_n$ representing the discrete Fourier coefficients corresponding to an ideal, undistorted test pulse;

d. generating in response to the algebraic sign of real and imaginary components of said coefficients $F_n$, a correction factor $C_n$ for each value of $F_n$ such that $C_n \cdot F_n = H_n$;

e. storing said generated correction values $C_n$;

f. subsequently sampling a received electrical signal $x(t)$ to provide a discrete set of signal sample values $x_k$, $k=0, 1 \ldots N-1$;

g. generating the discrete Fourier transform of the signal sample values $x_k$ to provide the discrete Fourier transform $X_n$;

h. multiplying $X_n$ by the stored correction factors $C_n$ to produce the frequency equalized coefficient $Y_n$ for $n=0, 1 \ldots N/2$, whereby $Y = C \cdot X$; and i. generating the inverse discrete Fourier transform of the coefficients $Y_n$ to provide an output signal in the time domain corresponding to said received electrical signal.

* * * * *